United States Patent [19]  [11] 3,975,456
Labana et al.  [45] Aug. 17, 1976

[54] POWDER PAINT WITH EPOXY AND AMIDE COPOLYMER AND ANHYDRIDE

[75] Inventors: Santokh S. Labana, Dearborn Heights; Stephen C. Peng, Utica, Mich.

[73] Assignee: Ford Motor Company, Dearborn, Mich.

[22] Filed: Feb. 24, 1975

[21] Appl. No.: 552,472

Related U.S. Application Data

[63] Continuation-in-part of Ser. No. 394,880, Sept. 6, 1973, abandoned.

[52] U.S. Cl. ............................ 260/836; 260/830 R; 260/830 TW; 427/27; 427/386; 526/1; 526/89; 526/271; 526/320; 526/328; 260/42.28; 260/78.41
[51] Int. Cl.$^2$ ................... C08L 63/10; C08F 18/14
[58] Field of Search .......... 260/830 R, 836, 78.4 D, 260/78.5 R, 47 EP, 47 EA

[56] References Cited
UNITED STATES PATENTS

| | | | |
|---|---|---|---|
| 3,781,379 | 12/1973 | Theodore et al. | 260/836 |
| 3,839,249 | 10/1974 | Wollner et al. | 260/835 |
| 3,845,016 | 10/1974 | Labana et al. | 260/837 R |
| 3,847,863 | 11/1974 | Labana et al. | 260/837 R |
| 3,876,587 | 4/1975 | Matsui et al. | 260/78.4 D |
| 3,939,127 | 2/1976 | Labana et al. | 260/78.4 D |

*Primary Examiner*—Murray Tillman
*Assistant Examiner*—Thurman K. Page
*Attorney, Agent, or Firm*—Olin B. Johnson; Keith L. Zerschling

[57] ABSTRACT

Improved powder coating compositions are disclosed which comprise a particulate mixture of (1) a qualitatively difunctional copolymer of about 5 to about 20 weight percent of a glycidyl ester of a monoethylenically unsaturated acid, about 2 to about 10 weight percent of an alpha-beta olefinically unsaturated amide and about 70 to about 93 weight percent monoethylenically unsaturated monomers consisting essentially of monofunctional monomers selected from the group consisting of esters of $C_1$–$C_8$ monohydric alcohol and methacrylic acid and $C_8$–$C_{12}$ monovinyl hydrocarbons, and (2) an anhydride crosslinking agent selected from the group consisting of monomeric anhydrides of dicarboxylic acids and homopolymers of monomeric anhydrides of dicarboxylic acids, the same being present in an amount such as to provide about 0.3 to about 1.2 anhydride groups for each functional group on the copolymer.

5 Claims, No Drawings

POWDER PAINT WITH EPOXY AND AMIDE COPOLYMER AND ANHYDRIDE

This application is a continuation-in-part of application Ser. No. 394,880 filed Sept. 6, 1973, now abandoned.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coating materials comprising (1) a copolymer of a glycidyl acrylate and other monofunctional olefinically unsaturated monomers, (2) an anhydride crosslinking agent and (3) a polymeric flow control agent were heretofore described in U.S. Pat. No. 3,781,379 issued Dec. 25, 1973 to S. S. Labana, a co-inventor herein et al.

THE INVENTION

It now has been discovered that powder coating compositions having certain unexpected advantages relative to the aforedescribed powder paint compositions can be obtained by employing an epoxy-functional copolymer that also has amide functionality in combination with an anhydride crosslinking agent. This is accomplished by substituting an alpha-beta olefinically unsaturated amide, e.g., acrylamide and methacrylamide, for a portion of the olefinically unsaturated monofunctional monomers used with the epoxy-functional monomer, e.g., glycidyl acrylate or methacrylate, in the synthesis of the epoxy-functional copolymer. Aside from crosslinking capabilities, the use of the difunctional copolymer above described in combination with the anhydride crosslinking agent provides a powder mix characterized by high polarity. This provides system compatibility (aids homogeneous mixing) of the complete coating system including pigment dispersion.

The powders prepared in accordance with this invention are more easily and more effectively processed by spray drying without phase separation. They may also be processed by melt blending and vacuum drying techniques. They are easily and effectively mixed by extrusion or mill rolling. Further, the need for a catalyst is eliminated, although a catalyst may be used, and the need for an antistatic agent is eliminated when a film depth of less than 4 mils (0.004 in.) is to be applied.

Except in those instances wherein a specific compound is named, the term "acrylate" is used in this specification to include esters of both acrylic acid and methacrylic acid, i.e., acrylates and methacrylates.

DETAILED DESCRIPTION OF THE INVENTION

Epoxy and amide functional copolymers suitable for use in the powder coating materials of this invention are readily formed by conventional free radical polymerization of suitable alpha-beta olefinically unsaturated monomers. These copolymers having both epoxide groups and amide groups are potentially self-crosslinking but the epoxy-amide reaction is very slow and requires large amounts of catalyst to accelerate the curing reaction. Thus, in the invention, a crosslinking agent, i.e., an anhydride, is added to the paint binder system.

The copolymers used in this invention contain between about 5 and about 20, preferably between 8 and 15 weight percent of a glycidyl ester of a monoethylenically unsaturated carboxylic acid, e.g., glycidyl acrylate and glycidyl methacrylate. These monomers provide the copolymer with its epoxy functionality. The amide functionality is provided by incorporating in the unsaturated monomer polymerization mix about 2 to about 10 weight percent of an alpha-beta olefinically unsaturated amide, e.g., acrylamide and methacrylamide. The remainder of the copolymer, i.e., about 70 to about 93 weight percent, consists essentially of monofunctional, alpha-beta olefinically unsaturated monomers. These can be acrylates or a mixture of acrylates and monovinyl hydrocarbons. Preferably, in excess of 50 weight percent of the copolymer monomers are esters of a $C_1$–$C_8$ monohydric alcohol and acrylic or methacrylic acid, i.e., methyl methacrylate, ethyl acrylate, butyl acrylate, butyl methacrylate, hexyl acrylate, and 2-ethylhexyl methacrylate. $C_8$–$C_{12}$ monovinyl hydrocarbons such as styrene, vinyl toluene, t-butyl styrene, chlorostyrene and alpha methyl styrene are suitable for use but preferably comprise less than 50 weight percent of the copolymer. Other vinyl monomers such as vinyl chloride, acrylonitrile, methacrylonitrile, and vinyl acetate may be used as modifying monomers. When employed, these comprise between 0 and 30 percent by weight of the monomer mixture.

The epoxy-functional and amide-functional copolymers used in these coating compositions have a glass transition temperature in the range of 40° to 90°C., preferably 50° to 80°C., and a molecular weight ($\bar{M}_n$) in the range of about 1500 to about 15000, preferably about 2500 to about 6000.

In preparing this copolymer the epoxy-functional monomer, e.g., glycidyl methacrylate, and the amide-functional monomer are mixed with the aforementioned ethylenically unsaturated remainder monomers and reacted by conventional free radical initiated polymerization in such proportions as to obtain the copolymer for the powder coating compositions. Thus, when the preferred ethylenically unsaturated remainder monomers are used with the epoxy-functional monomer and the amide-functional monomer to form the copolymer, the epoxy-functional monomer, e.g., glycidyl methacrylate, is present in the copolymer from about 5 weight percent to about 20 weight percent, the amide-functional monomer, e.g., methacrylamide, is present in the copolymer from about 2 to about 10 weight percent, the modifying monomer, e.g., acrylonitrile or methacrylonitrile, is present in the copolymer from about 0 to about 30 weight percent and the remainder of the monomers are present from about 93 to about 70 weight percent. Generally, a free radical initiator is needed to induce the polymerization reaction. A large number of free radical initiators are known to the art and are suitable for this purpose. These include benzoyl peroxide, lauryl peroxide, t-butylhydroxyperoxide, acetylcyclohexane sulfonyl peroxide, diisobutyryl peroxide, di-(2-ethylhexyl) peroxydicarbonate, di-isopropyl peroxydicarbonate, t-butylperoxypivalate, decanoyl peroxide, azobis (2-methylpropionitrile), etc. The polymerization is preferably carried out in solution using a solvent in which the epoxy-functional, amide-functional copolymer is soluble. Toluene, xylene, dioxane, butanone, dichloromethane, etc., are suitable solvents for this polymerization. If the epoxy-functional, amide-functional copolymer is prepared in solution, the solid copolymer can be precipitated by pouring the solution at a slow rate into a nonsolvent for such copolymer such as hexane, octane or water under a suitable agitation condition. The copolymer thus obtained is further dried so that it contains less than three percent of the materials that volatilize at the temperatures used for baking the coatings.

These copolymers can also be prepared by emulsion polymerization, suspension polymerization, bulk polymerization, or their suitable combinations. In these methods of preparing the copolymers, chain transfer agents may be required to control the molecular weight of the copolymer to a desired range. The solid copolymers obtained by these methods must also be dried to contain less than three percent of the materials that volatilize at the temperatures used for baking the coatings.

For powder coating applications, both molecular weight and molecular weight distribution of the epoxy-functional, amide-functional copolymer is important. While the molecular weight ($\overline{M}_n$) range extends from about 1,500 to about 15,000, the copolymer component must not contain significant amounts of higher molecular weight fractions. No more than 5 percent of the copolymer should be of molecular weight greater than 20,000. The molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

The anhydride crosslinking agent may be either monomeric or polymeric and is employed in an amount such as to provide about 0.3 to about 1.2 anhydride groups per epoxy group in the copolymer.

Where the anhydride is monomeric, the preferred anhydrides are selected from the group consisting of phthalic anhydride, p-chloro phthalic anhydride, tetrabromo phthalic anhydride, cyclohexane -1,2 - dicarboxylic anhydride, 4 methylhexane -1,2 - dicarboxylic anhydride, cyclopentane -1,2 - dicarboxylic anhydride, dodecyl succinic anhydride, succinic anhydride, maleic anhydride and mthyl succinic anhydride. In general, the preferred monomeric anhydrides are those which are ring compounds having a melting point in the range of about 35° to 140°C.

Where the anhydride is polymeric, the preferred polyanhydrides are polyadipic anhydride, polyazelaic anhydride, and polysebasic anhydride but others having molecular weight up to about 5000 are useful. Those having molecular weight in the range of about 1,000 to about 2500 are preferred.

These powder coating compositions advantageously contain a flow control agent as a part of the powder coating mixture. The flow control agent is a polymer having a molecular weight ($\overline{M}_n$) of at least 1000 and comprises between 0.05 and 4.0 weight percent of the mixture. The flow control agent has a glass transition temperature at least 20°C. below the glass transition temperature of the mixture's copolymer.

One group of suitable flow control agents are acrylic polymers. Preferred acrylic polymers which may be used for the flow control agent are polylauryl acrylate, polybutyl acrylate, poly (2-ethylhexyl acrylate), polylauryl methacrylate and polyisodecyl methacrylate.

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octonoic acid is a useful flow control agent. Polymeric siloxanes of molecular weight of over 1000 (advantageously 1000 to 20,000) may also be useful as flow control agents, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200°C. and the catalyst should produce a gel time for the powder coating composition at the baking temperature to be used which is at least 1 minute but no greater than 20 minutes. This gel time is preferably in the range of 1 to 12 minutes and most preferably between about 2 and about 8 minutes.

Some catalysts which are suitable for use in the powder coating compositions include tetraalkylammonium salts, imidazole type catalysts, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. Suitable catalysts of the imidazole type include: 2-methyl-4-ethyl imidazole, 2-methyl imidazole, imidazole, 2 - [(N-benzylanilino) methyl] - 2 - imidazoline phosphate, and 2 - benzyl - 2 - imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2 - ethylhexoate, phenylmercuric propionate, lead neodeconoate, dilbutyl tin dilaurate and lithium benzoate.

The catalyst used in an individual powder coating composition is generally solid at room temperature and has a melting point of from 50° to 200°C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkyl-poly (ethyleneoxy) phosphate or alkylauryl poly (ethyleneoxy) phosphates as, for example, ethyl benzyl poly (ethyleneoxy) phosphate; polyethyleneimine, poly (2-vinyl pyrollidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributyl-phosphate, dibutylphthalate, dioctylphthalate, butyl octyl phthalate, dioctyl sebacate, butyl benzyl sebacate, dibenzyl sebacate, butanediol - 1,4 - diglycidyl ether, diglycidyl ether of bisphenol A and its polymers and cellulose acetate butyrate.

Having described the various materials which are employed in formulating the powder coating compositions of this invention, a plurality of examples are hereinafter set forth to illustrate various individual powder coating compositions.

EXAMPLE 1

An epoxy-functional, amide-functional copolymer is prepared from the below listed components in the manner hereinafter described.

| Reactants | Amounts, grams | Percent By Weight Of Total Reactants |
|---|---|---|
| glycidyl methacrylate | 45 | 15 |
| acrylamide | 15 | 5 |
| butyl methacrylate | 111 | 37 |
| methyl methacrylate | 129 | 43 |

The above mentioned monomers are admixed in the proportions above set forth and 11.0 grams of 2,2' - azobis - (2-methylpropionitrile), hereinafter called AIBN, are added to the mixture. The mixture is slowly added to 200 ml of toluene heated to 80°–90°C. which is being stirred vigorously under a nitrogen atmosphere. A condenser is provided at the top of the toluene container to condense the toluene vapors and return the condensed toluene to the container. The monomer mixture is added through a regulating valve and the rate of addition is controlled to maintain a reaction temperature of 90°–110°C. with the rest of the heat supplied from an external heater. After the addition of the monomer mixture is completed (3 hours), 0.8 grams of AIBN dissolved in 10 ml acetone is added over a ½ hour period and refluxing is continued for 2 additional hours.

The resultant toluene - polymer solution is diluted with 200 mls. acetone and coagulated in 2 liters of hexane. The white powder is dried in the vacuum oven at 55°C. for 24 hours. Its molecular weight is determined to be $M_w/M_n = 6700/3200$ and WPE (molecular weight per epoxide group) is about 1000.

Forty-seven grams of the prepolymer are ball-milled with 3 grams of Epon 1001, a commercially available epichlorohydrin-bisphenol A type diepoxide (melting range — 64°–76°C., viscosity in poise — 0.8–1.7 as a 40% solution in butylcarbitol, average molecular weight — 900 and an average WPE of 450–525), 6.0 grams of polyazelaic polyanhydride, 4.5 grams of titanium dioxide, 4.0 grams of Ferrite yellow (pigment) and 0.4 grams of poly (2 - ethylhexyl acrylate) for 3–5 hours. The molecular weight of the poly (2-ethylhexyl acrylate) is determined to be $(\overline{M}_n) = 9000$. The fine powder mixture is mill rolled at 100°C. for 5 minutes, cooled, granulated and pulverized to particles of 15–50 microns.

The resulting powder obtained in this fashion is a powder coating composition of the invention. The powder is sprayed electrostatically on a grounded steel panel by using an electrostatic powder spray gun operating at 60 KV charging voltage. After deposition of powder, the panel is heated to 175°C. and maintained at that temperature for 20 minutes.

The glossy coating obtained on the panel has good adhesion to the steel panel and good impact strength. This coating when applied to other substrates such as glass, brass, zinc, aluminum, copper and bronze also exhibits good adhesion. The coatings obtained are not soluble in gasoline, xylene, acetone, methyl, ethyl ketone or toluene.

EXAMPLE 2

An epoxy-functional, amide-functional copolymer is prepared from the below listed components in the manner hereinafter described:

| Reactants | Percent By Weight Of Total Reactants |
|---|---|
| glycidyl methacrylate | 10 |
| methacrylamide | 5 |
| butyl methacrylate | 45 |
| methyl methacrylate | 40 |

These monomers are admixed. AIBN in the amount of 6 percent of the total mixture is dissolved in 5.0 ml acetone and added to the monomer mixture. These monomers are reacted using the procedure of Example 1 and an epoxy-functional, amide functional copolymer is formed. This copolymer has a glass transition temperature, hereinafter referred to as Tg. of 53.

The 47 percent toluene solution containing 100 grams of this prepolymer is dispersed with 4.0 grams of polyazelaic polyanhydride, 3.0 grams of the diepoxide used in Example 1, 5.0 grams titanium dioxide, 4.0 grams Ferrite yellow and 0.41 grams of poly (2-ethylhexyl acrylate), $M_n = 9000$. The dispersion is accomplished by ball milling the mixture overnight in a pebble mill. The resulting homogeneous mixture is reduced to 40 percent total solids with toluene and spray dried at 140°F.

A homogeneous powder is produced which contains less than 1.3 percent solvent and is in a form suitable for spraying on substrates mentioned in Example 1.

After the powder is deposited on steel panels electrostatically as in Example 1, it is cured at 170°C. for 25 minutes. The resulting glossy coating has good adhesion and impact strength. It is not soluble in xylene, toluene, gasoline, methanol and methyl ethyl ketone.

EXAMPLE 3

An epoxy-functional, amide-functional copolymer is prepared from the below listed components in the manner hereinafter described:

| Reactants | Grams | Percent By Weight Of Total Reactants |
|---|---|---|
| glycidyl methacrylate | 195.0 | 13 |
| acrylamide | 75.0 | 5 |
| butyl methacrylate | 630.0 | 42 |

| Reactants | Grams | Percent By Weight Of Total Reactants |
|---|---|---|
| methyl methacrylate | 600.0 | 40 |

These monomers are admixed. AIBN in the amount of 67.0 grams (4.5 percent) is dissolved in 100 mls. of acetone and added to the monomer mixture. The monomers are reacted as in Example 1 in order to produce the copolymer.

The copolymer is isolated in the amount of 47.0 grams and compounded as in Example 1 with 3.0 grams of the diepoxide used in Example 1, 5.0 grams polyazelaic polyanhydride, 4.5 grams titanium dioxide, 4.0 grams Ferrite yellow and 0.40 grams of poly (2-ethylhexyl acrylate), $M_n = 9000$. This mixture is ball milled for 5 hours and mill-rolled for 10 minutes at 110°C. The resulting powder having diameters in the range of 15–60 microns is deposited on steel panels and the other substrates mentioned in Example 1.

After curing the deposited powder on the steel panels at 170°C. for 20 minutes, the deposited coating is very glossy (91 at 60°) and has good solvent resistance (xylene, gasoline, toluene, etc.) The coatings exhibit good adhesion and impact strength.

EXAMPLE 4

An epoxy-functional, amide-functional copolymer is prepared from the following components in the manner hereinafter set forth.

| Reactants | Grams | Percent By Weight Of Total Reactants |
|---|---|---|
| glycidyl methacrylate | 80.0 | 15 |
| methacrylamide | 6.0 | 3 |
| butyl methacrylate | 84.0 | 42 |
| methyl methacrylate | 80.0 | 40 |

AIBN in the amount of 11.0 grams (5.5%) are dissolved in 25 mol acetone and added to the monomer mixture. The monomers are reacted as in Example 1 to produce an epoxy-functional, amide-functional copolymer.

This copolymer is isolated as in Example 1 and compounded with the same amounts of the same materials as in Example 1 using a Brabender Plasticorder extruder at 110°C. The resulting coating on steel panels is glossy (89° at 60°) and has excellent solvent resistance. These coatings exhibit good adhesion and impact strength. No solvent marks were present after dipping the coated panels in toluene, xylene or methyl ethyl ketone for 1 minute.

EXAMPLE 5

An epoxy-functional, amide-functional copolymer is prepared from the following components in the manner hereinafter set forth:

| Reactants | Grams | Percent By Weight Of Total Reactants |
|---|---|---|
| glycidyl methacrylate | 20.0 | 10 |
| acrylamide | 6.0 | 3 |
| butyl methacrylate | 94.0 | 47 |
| methyl methacrylate | 80.0 | 40 |

AIBN in the amount of 12.0 grams (6%) dissolved in 25 ml acetone is added to the monomer mixture. The monomers are reacted following the procedure of Example 1 to produce an epoxy-functional, amide-functional copolymer having molecular weight of $M_w$–$M_n$ = 5550/2960 and a Tg of 53°C.

This copolymer is isolated and compounded with the same ingredients as in Example 1. The finished powder is deposited and cured as in Example 1. The resulting coatings are very glossy.

EXAMPLE 6

An epoxy-functional, amide-functional copolymer is prepared from the following components in the manner hereinafter set forth:

| Reactants | Percent By Weight Of Total Reactants |
|---|---|
| glycidyl methacrylate | 10 |
| acrylamide | 10 |
| butyl methacrylate | 40 |
| methyl methacrylate | 40 |

The above listed monomers are admixed and to this mixture is added 12 grams of AIBN (6%) dissolved in 20 ml of acetone. The monomers are reacted following the procedure of Example 1 and an epoxy-functional, amide-functional copolymer is produced.

Isolation and compounding of this prepolymer is carried out following the procedure of Example 1 using the same ingredients, exclusive of the copolymer, in the same proportions as in Example 1. Deposition and curing of the coatings is carried out following the procedures of Example 1. The gloss and other properties of the cured films is acceptably good but the gloss is not as high as in Examples 2, 3, 4 and 5.

EXAMPLE 7

The procedures of Examples 1–6 are repeated with the single difference that an equimolar amount of glycidyl acrylate is substituted for the glycidyl methacrylate in the copolymer.

EXAMPLE 8

An epoxy-functional, amide-functional copolymer is prepared from the below listed components in the manner hereinafter described:

| Reactants | Percent By Weight Of Total Reactants |
|---|---|
| glycidyl methacrylate | 17 |
| methacrylamide | 8 |
| butyl methacrylate | 35 |
| methyl methacrylate | 40 |

The above mentioned monomers are admixed in the proportions above set forth and 8 grams of AIBN are added to the mixture. The mixture is slowly added to refluxing toluene (200 ml) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°–112°C.) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110°C. Drying is continued until the solvent content of the copolymer is below 3 percent. The trays are cooled and the copolymer collected and ground to pass through 20 mesh screen.

One hundred parts by weight of the ground copolymer are mixed with the following materials:

|  | Parts By Weight |
|---|---|
| Succinic anhydride | 10.6 |
| Tetrabutyl ammonium bromide | 0.2 |
| Polylauryl acrylate ($\overline{M}_n = 10,000$) | 0.5 |
| Titanium dioxide | 30.0 |

The materials are mixed together in a ball mill for 2 hours. The mixture is mill rolled at 85° to 90°C. for 5 minutes. The solid obtained is ground in a ball mill to pass through a 140 mesh screen.

The resulting powder thus obtained is a powder which is sprayed on an electrically grounded, steel panel by using electrostatic spray gun operating at 50 KV charging voltage. After spraying, the panel is heated at 175°C. for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE 9

The procedure of Example 8 is repeated. The formation of the copolymer, however, is formed from a monomer mixture of which 5 percent by weight is glycidyl methacrylate, 10 percent by weight of methacrylamide, 40 percent by weight of butyl methacrylate and 45 percent by weight of methyl methacrylate. 2.5 weight percent of the reaction initiator AIBN is employed. The molecular weight ($\overline{M}_n$) of the copolymer is 10,000.

One hundred parts by weight of the copolymer produced is mixed with the same additional ingredients set forth in Example 11 except that 5.5 parts maleic anhydride are used in lieu of the 10.6 parts by weight of succinic anhydride. The quality of the coatings on the painted panels obtained after application of the powder coating materials to the various substrates is about the same as achieved in Example 11.

EXAMPLE 10

A monomer mixture having the following composition is prepared: glycidyl methacrylate 8 percent by weight, acrylamide 8 percent by weight, butyl methacrylate 40 percent by weight and methyl methacrylate 44 percent by weight. The monomer mixture is processed in the same manner as described in Example 8 with 3 percent by weight of the reaction initiator employed. One hundred parts of this copolymer is mixed with the same additional ingredients described in Example 1, except that 9.4 parts of itaconic anhydride are used.

The powder coating composition obtained by following the process steps set forth in Example 1 is applied to test panels in the same manner as described in Example 1. The coating is baked at a temperature of 170°C. for 30 minutes. The coating obtained has good adhesion to steel, glass, brass, zinc, aluminum, copper and bronze.

EXAMPLE 11

A monomer mixture having the following composition is prepared: glycidyl methacrylate 20 percent by weight, acrylamide 2 percent by weight, butyl methacrylate 35 percent by weight and methyl methacrylate 43 percent by weight. A copolymer is formed from this monomer mixture using the procedure of Example 11. In this case, 6 percent by weight of the reaction initiator AIBN is added. The molecular weight ($\overline{M}_n$) of the copolymer is 1500 and distribution ($\overline{M}_w/\overline{M}_n$) is 2.2.

The ground copolymer (100 parts by weight) is added to the following materials:

|  | Parts By Weight |
|---|---|
| Glutaric anhydride | 16.0 |
| Tetrabutylammonium chloride | 0.1 |
| Polybutylacrylate ($\overline{M}_n = 9000$) | 4.0 |
| Titanium dioxide | 15.0 |
| Transparent blue | 4.0 |
| Metallic aluminum flakes | 4.0 |

The above ingredients are mixed together and processed in accordance with the procedure of Example 11 to obtain a powder coating composition. The powder coating composition is sprayed on various test panels of steel, glass, brass, zinc, aluminum, copper and bronze. The coating obtained on each test panel after curing of the powder coating composition at a temperature of 200°C. for 10 minutes is of good quality, is solvent and scratch resistant, and has a metallic appearance.

EXAMPLE 12

The procedure of Example 14 is repeated except for the following changes in the preparation of the copolymer: the glycidyl methacrylate comprises 5 percent by weight of the copolymer, the acrylamide comprises 10 percent by weight of the copolymer and the AIBN is added in an amount equal to 2.5 percent by weight of the monomer mixture.

EXAMPLE 13

A monomer mixture having the following composition is prepared: glycidyl methacrylate 15 percent by weight, acrylamide 7 percent by weight, butyl acrylate 20 percent by weight, and methyl methacrylate 58 percent by weight. The monomer mixture is reacted as set forth in Example 11 and a copolymer is produced. Four percent by weight of the reaction initiator is employed in reacting the monomer mixture to form the copolymer.

One hundred parts by weight of the copolymer obtained is added to the following materials:

|  | Parts By Weight |
|---|---|
| Phthalic anhydride | 15.6 |
| Triethylene diamine | 0.1 |
| Tetraethylammonium chloride | 0.5 |
| Polylaurylmethacrylate ($\overline{M}_n = 6000$) | 2.0 |
| Phthaloycanine green | 7 |
| Titanium dioxide | 10 |

The above described materials are processed as described in Example 1 in order in Example 1 and baked on the panels at a temperature of 150°C. for 15 minutes.

The coating obtained has good adhesion to steel, glass, brass, zinc, aluminum, copper and bronze and is insoluble in toluene, gasoline, methanol and butanone.

EXAMPLE 14

The procedure of Example 13 is repeated except for the differences that (1) 16.2 parts by weight of tetrahydrophthalic anhydride is substituted for the phthalic anhydride, an equal weight amount of poly (2-ethylhexyl acrylate $\overline{M}_n= 11,000$) is substituted for the polylaurylmethacrylate and the coatings are baked at a temperature of 180°C. for 5 minutes. The adhesion quality of the powder coating after baking on the various test panels is good. The coating on each panel possesses good solvent and scratch resistance.

EXAMPLE 15

The procedure of Example 13 is repeated except for the differences that (1) the copolymer is made up of glycidyl methacrylate 15 percent by weight, acrylamide 6 percent by weight. Vinyl chloride 22 percent by weight, butyl methacrylate 17 percent by weight, and methyl methacrylate 40% by weight, (2) 18.6 parts by weight of cyclohexane - 1,2 dicarboxylic anhydride is substituted for the phthalic anhydride, 2 parts by weight of poly (2-ethylhexyl acrylate - $\overline{M}_n= 11,000$) is substituted for the polylaurylmethacrylate, and the coating composition is baked at 170°C. for 15 minutes. All the painted panels exhibit good adhesion and solvent resistance properties.

EXAMPLE 16

The procedure of Example 13 is repeated except for the differences that (1) the copolymer is formed from glycidyl methacrylate 20 percent by weight, acrylamide 2 percent by weight, isobutyl acrylate 25 percent by weight, alpha methyl styrene 15 percent by weight, methacrylonitrile 15 percent by weight and methyl methacrylate 23 percent by weight, (2) 2 parts by weight of polyethylene glycol perfluoro octonoate ($\overline{M}_n= 3400$) is substituted for the polylaurylmethacrylate and the coated panels are baked at 165°C. for 15 minutes. The coating on each panel has good adhesion and solvent resistance.

EXAMPLE 17

The procedure of Example 13 is repeated except for the differences that the copolymer is formed from glycidyl methacrylate 12 percent by weight, acrylamide 3 percent by weight, 2-ethylhexyl acrylate 10 percent by weight, acrylonitrile 25 percent by weight, and methyl methacrylate 40 percent by weight, (2) 4 percent by weight of AIBN is added to the monomer mixture used to form the copolymer and (3) the panels are baked at 150°C. for 20 minutes. The adhesion to the panels of the powder coating is good and each of the coatings possesses good solvent resistance.

EXAMPLE 18

The procedure of Example 13 is repeated except for the differences that (1) the copolymer is formed from glycidyl methacrylate 10 percent by weight, acrylamide 10 percent by weight, butyl methacrylate 30 percent by weight and methyl methacrylate 40 percent by weight, and (2) 1.5 parts by weight of polyisodecyl methacrylate ($\overline{M}_n=5000$) is substituted for the polylaurylmethacrylate, and (3) the coatings are baked at 160°C. for 10 minutes. The coatings demonstrate good adhesion and organic solvent resistance.

EXAMPLE 19

The procedure of Example 13 is repeated except for the differences that 18 parts by weight of P-chlorophthalic anhydride are substituted for the phthalic anhydride. The coatings obtained have good adhesion to glass and a variety of metal substrates and demonstrate good organic solvent resistance.

EXAMPLE 20

The procedure of Example 2 is repeated except for the differences that (1) the monomers used to form the copolymer are: glycidyl methacrylate 15 parts by weight, acrylamide 5 parts by weight, butyl methacrylate 10 parts by weight and methyl methacrylate 70 parts by weight, (2) AIBN is employed in the amount of 4 parts by weight (base total weight of monomers used to form copolymer) and (3) 100 parts by weight of the copolymer are mixed with 24 parts by weight of polyazelaic anhydride.

EXAMPLE 21

The procedure of Example 20 is repeated except for the difference that 8 parts by weight of polyazelaic polyanhydride are mixed with 100 parts by weight of the copolymer.

EXAMPLE 22

The procedure of Example 21 is repeated except for the differences that (1) the composition of the copolymer is glycidyl methacrylate 15 parts by weight, methacrylamide 5 parts by weight, methyl methacrylate 35 parts by weight and butyl methacrylate 45 parts by weight, and (2) 100 parts of the copolymer are employed with 14 parts of polyazelaic poly anhydride and 3 parts of a commercially available epoxy resin, Epon 1001.

EXAMPLE 23

The procedure of Example 1 is repeated except that 3 grams of Epon 1001 are replaced by 3 grams of Epon 1004.

EXAMPLE 24

The procedure of Example 1 is repeated except that 3 grams of Epon 1001 are replaced with 2 grams of dicyclo hexylphthalate.

EXAMPLE 25

The procedure of Example 1 is repeated except that 3 grams of Epon 1001 are replaced by 4 grams of cellulose acetate butyrate.

Many modifications of this invention will be apparent to those skilled in the art in view of this specification. It is intended that all such modifications which fall within the scope of this invention be included within the appended claims.

We claim:

1. In a thermosettable powder paint which exclusive of pigments, catalysts, antistatic agents, plasticizers, and flow control agents, the same being conventional non-reactive additives to a thermosettable powder paint, consists essentially of a coreactable particulate mixture of A. a copolymer consisting essentially of about 5 to about 20 weight percent of a glycidyl ester of a monoethylenically unsaturated acid and about 80 to about 95 weight percent of other monoethylenically unsaturated monomers, and having a glass transition temperature in the range of about 40° to about 90°C. and a molecular weight ($\overline{M}_n$) in the range of about 1500 to about 15,000, and B. an anhydride crosslinking agent selected from the group consisting of
  1. monomeric anhydrides of dicarboxylic acids, and
  2. homopolymers of anhydrides of dicarboxylic acids, and present in an amount that provides about 0.3 to about 1.2 anhydride groups for each functional group on said copolymer, the improvement wherein said copolymer is qualitatively difunctional and said other monoethylenically unsaturated monomers consist essentially of difunctional monomers selected from the group consisting of acrylamide and methacrylamide in an amount comprising about 2 to about 10 weight percent of said copolymer and monoethylenically unsaturated monomers consisting essentially of monofunctional monomers selected from the group consisting of esters of a $C_1$–$C_8$ monohydric alcohol and acrylic acid, esters of a $C_1$–$C_8$ monohydric alcohol and methacrylic acid and $C_8$–$C_{12}$ monovinyl hydrocarbons.

2. A powder paint in accordance with claim 1 wherein about 50 weight percent of said monofunctional monomers are acrylates and methacrylates.

3. A powder paint in accordance with claim 1 wherein said copolymer has molecular weight ($\overline{M}_n$) in the range of about 2,500 to about 6,000.

4. A powder paint in accordance with claim 1 wherein said glycidyl ester of a monoethylenically unsaturated acid is selected from glycidyl acrylate and glycidyl methacrylate.

5. A powder paint in accordance with claim 1 wherein said monomeric anhydrides have melting points in the range of about 35° to about 140°C. and said homopolymers of monomeric anhydrides have molecular weight ($\overline{M}_n$) in the range of about 1,000 to about 5,000.

* * * * *